United States Patent [19]

Vlnaty

[11] 4,305,738
[45] Dec. 15, 1981

[54] APPARATUS FOR REMOVING MICRONIZED COAL FROM STEAM

[75] Inventor: Joseph Vlnaty, Pittsburgh, Pa.

[73] Assignee: Dravo Corporation, Pittsburgh, Pa.

[21] Appl. No.: 116,936

[22] Filed: Jan. 30, 1980

Related U.S. Application Data

[62] Division of Ser. No. 966,204, Dec. 4, 1978, Pat. No. 4,227,892.

[51] Int. Cl.³ .............................................. B01D 47/10
[52] U.S. Cl. ........................................ 55/238; 55/319; 55/459 R
[58] Field of Search .................. 55/228, 257 R, 257 C, 55/462, 459 R, 238, 319

[56] References Cited

U.S. PATENT DOCUMENTS

| | | | |
|---|---|---|---|
| 2,265,707 | 12/1941 | Wall | 55/462 X |
| 2,943,064 | 6/1960 | Lipkin | 252/444 |
| 4,036,606 | 7/1977 | Zimmermann et al. | 55/89 X |
| 4,061,479 | 12/1977 | Holter et al. | 55/459 R X |
| 4,198,290 | 4/1980 | Summers | 55/459 R X |

FOREIGN PATENT DOCUMENTS 2553731  6/1977  Netherlands ...................... 55/228

Primary Examiner—William A. Cuchlinski, Jr.
Attorney, Agent, or Firm—Parmelee, Miller, Welsh & Kratz

[57] ABSTRACT

Micronized coal is removed from coal-bearing steam by spraying stabilized petroleum oil into the steam and directing the resultant stream at a separation surface on which a coal-oil slurry is deposited and collected. Apparatus includes conduits which direct the resultant stream downward into a housing and normal to a surface on which the slurry is deposited by impact forces. In additional apparatus disclosed, the resultant stream is directed from a horizontal conduit circumferentially along the interior wall of a horizontally disposed cylindrical chamber at the top of the chamber and the coal-oil slurry deposited on the wall by centrifugal force is collected in a trough situated below a longitudinal slot at the bottom of the chamber. In both types of apparatus, after separation of the slurry the velocity of the steam is reduced to settle out remaining oil droplets and is then discharged to the atmosphere.

6 Claims, 2 Drawing Figures

APPARATUS FOR REMOVING MICRONIZED COAL FROM STEAM

This is a division, of application Ser. No. 966,204 filed Dec. 4, 1978 now U.S. Pat. No. 4,227,892.

BACKGROUND OF THE INVENTION

1. Field of the Invention

This invention relates to a method and apparatus for removing micronized coal from steam used to pulverize coal by spraying petroleum oil into a stream of the coal-bearing steam and separating the coal and oil from the steam in the form of a coal-oil slurry through the use of impact or centrifugal forces.

2. Prior Art

It is becoming increasingly common to mix pulverized coal with oil for use as an industrial fuel. The finely divided coal required can be produced by fluid energy mills which utilize high pressure steam to reduce the size of the coal particles through high speed collision and refraction. The discharge of the mill is fed to cyclones which separate the pulverized coal from the steam for mixing with the oil in proper proportion for the desired fuel mixture.

Unfortunately, however, steam exiting the cyclones is ladden with large quantities of micron and submicron sized coal particles. Recovery of this residual coal is important because the fine coal particles are highly explosive, are valuable for increasing the yield of the process of making the coal-oil mixture and cannot be released into the atmosphere under existing pollution regulations. The conventional collectors for suspended particulates, such as scrubbers, baghouses, condensors and electrostatic precipitators, cannot remove the micronized coal particles from the steam effectively without danger of fires, explosions and water pollution.

SUMMARY OF THE INVENTION

According to the invention, micronized coal is removed from steam used to pulverize coal by spraying droplets of petroleum oil into a stream of the coal-bearing steam. The resultant stream is directed onto a separation surface to deposit a coal-oil slurry thereon and the coal-oil slurry is collected from the separation surface. The droplets of oil induce nucleation and agglomeration of the coal particles and create an oil film for impingement of the coal particles.

Separation of the coal-oil slurry from the steam car be effected by directing the steam containing coal and oil at the separation surface at substantially a right angle thereto to effect separation by impact forces, by directing the steam at a curved separation surface at a shallow angle to effect separation by centrifugal force or by a combination of these forces.

The coal-oil slurry may be concentrated through recycling by spraying the collected coal-oil slurry back into the flow of steam, coal and oil. In this manner the concentration of coal to oil can be increased from about 3–5% by weight up to the concentration of a suitable fuel mixture such as 50% by weight.

Preferably, the petroleum oil is stabilized with heat prior to being sprayed into the stream of coal bearing steam to drive off the volatile constituents. This reduces pollution in the effluent steam and reduces the danger of fire. It is also preferable to cool the stabilized oil to about 200° F. prior to introduction into the stream of coal-bearing steam. However, the temperature of the stream should be kept above about 220° F. to preclude condensation of the steam and, if necessary, superheated steam may be introduced into the stream for this purpose. In some circumstances, it may be necessary to spray water into the stream to maintain the temperature below 300° F. to reduce the possibility of fire.

After the coal-oil slurry has been removed from the steam, the velocity of the steam is reduced below the settling velocity of the oil droplets to remove any residual oil from the steam.

The invention also encompasses apparatus for carrying out the above process. Such apparatus includes means for guiding a continuous flow of coal-bearing steam, means for spraying droplets of oil into the flow, means disposed in the flow of coal and oil-bearing steam defining a separation surface on which the flow is directed to deposit thereon a coal-oil slurry and means for collecting the coal-oil slurry.

In one embodiment, the coal-bearing steam is guided by a length of substantially straight conduit into which the oil is sprayed. The conduit directs the flow of coal, oil and steam onto a plate which is disposed in spaced relation to the end of the conduit and substantially normal thereto, whereby the coal-oil slurry is separated from the steam by impact forces. Preferably, the conduit is directed downward into a housing having a discharge opening for the steam near the top thereof. Baffles in the housing direct the rising steam around the downward directed conduit to help maintain the desired operating temperature and to reduce the velocity of the steam below the settling velocity of the oil to effect separation of oil droplets remaining in the steam after impingement on the separation surface. Demisters immediately before the discharge opening remove water droplets from the steam before it is exhausted to the atmosphere. Means are provided for introducing additional noncoal bearing steam into the conduit when needed to maintain the pressure in the housing above atmospheric pressure which precludes the entrance of oxygen into the housing, thereby reducing the fire hazard.

In another embodiment of the apparatus, the stream of coal and oil-bearing steam is directed at a curved separation surface to deposit the coal-oil slurry on this surface by centrifugal force. More particularly, the separation surface is provided by a tube forming a horizontally disposed chamber. The flow of coal, oil and steam is directed circumferentially along the interior wall of the cylindrical chamber from a point near the top of the cylinder, such that the coal-oil slurry is deposited on the curved interior wall of the chamber. The slurry is collected in a trough disposed below a slot which extends longitudinally along the cylindrical chamber at the lowest point thereof. The steam escapes through the slot into a housing forming an expansion chamber in which the velocity of the steam is reduced below the settling velocity of any oil droplets remaining in the steam. A second trough in the housing collects the additional oil extracted from the steam and a deflector guides the steam flow across the first trough and into the housing.

DESCRIPTION OF THE PREFERRED EMBODIMENTS

Figure 1:
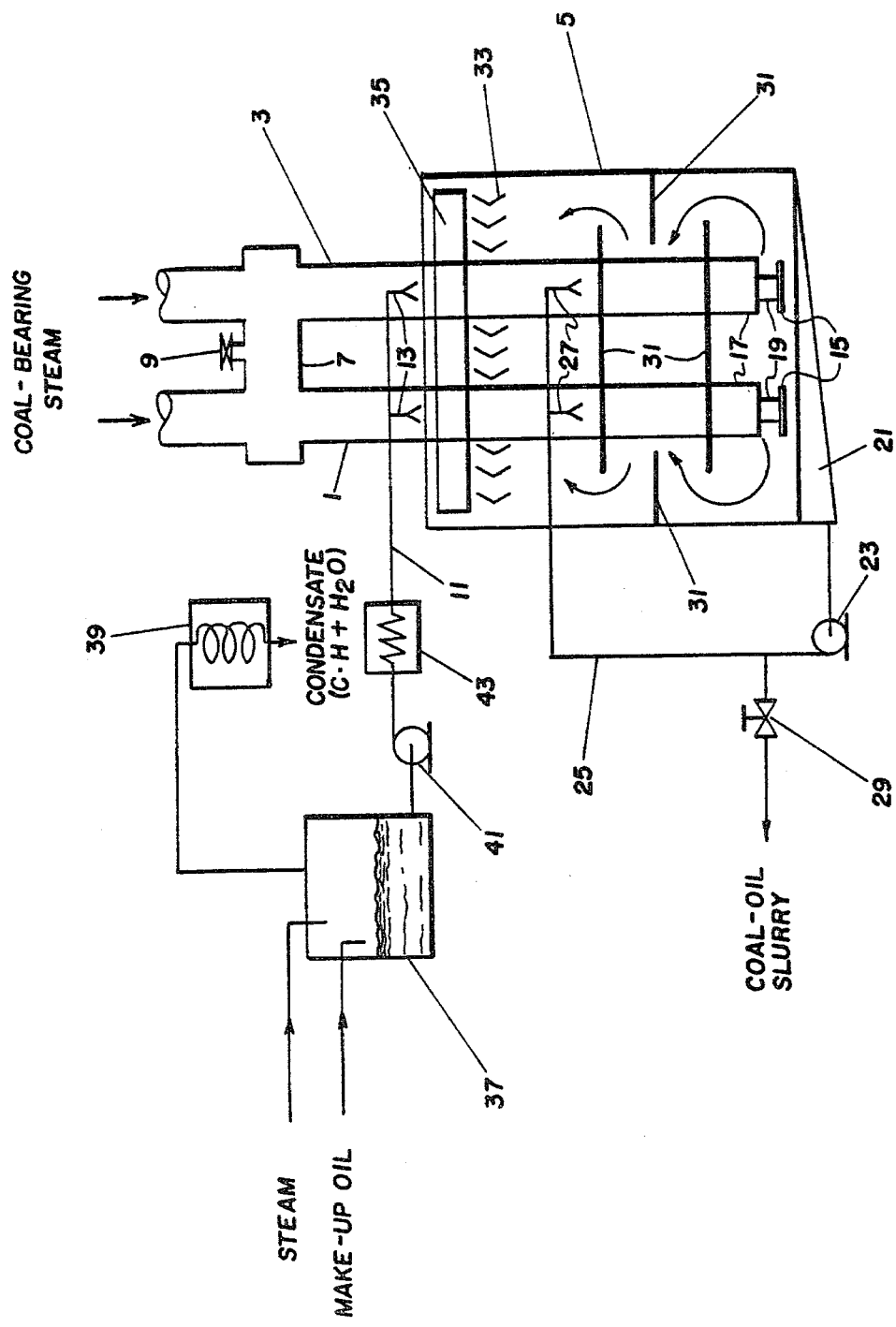
FIG. 1 is a schematic front elevation view of apparatus in accordance with one embodiment of the invention.

According to one embodiment of the invention, a pair of conduits 1 and 3 are directed vertically downward into a housing 5. While the apparatus illustrated utilizes two conduits, it is to be understood that the number of conduits is not critical and one or three or more such conduits could be utilized dependent upon the volume of coal-bearing steam to be treated. The two conduits 1 and 3 are interconnected above the housing 5 by a header 7 which equalizes the flow in the two conduits and provides pressure relief through a safety valve 9.

Steam laddened with micronized coal from the cyclones of a coal pulverizer plant is fed downward into the conduits 1 and 3. Petroleum oil supplied by a line 11 is sprayed into the stream of coal-bearing steam concurrent with the flow by nozzles 13 mounted inside the conduits 1 and 3. The resultant streams of coal, oil and steam are directed at separation surfaces formed by plates 15 mounted in spaced relation to the lower ends 17 of the conduits 1 and 3 by adjustable brackets 19. As the streams of coal, oil and steam impinge upon the upper surfaces of the plates 15, a slurry of coal and oil is deposited thereon. This coal-oil slurry drains off the plates 15 and is collected in a trough 21 at the bottom of the housing 5. The spacing between the plates 15 and the ends of the conduits 1 and 3 may be adjusted by the adjustable brackets 19.

A portion of the coal-oil slurry which is collected in the trough 21 is recirculated by pump 23 through a line 25 and sprayed back into the streams of coal, oil and steam by a second set of nozzles 27 mounted in the conduits 1 and 3. This recirculation increases the concentration of coal in the slurry. Another portion of the coal-oil slurry is drawn off through the valve 29. By appropriate proportioning of the flow of makeup oil injected by the nozzles 13 to the flow of recirculation coal-oil slurry injected by the nozzles 27, the concentration of coal in the slurry can be adjusted. A continuous flow of coal-oil slurry of the selected concentration of coal can then be withdrawn through the valve 29 at the same rate that makeup oil is supplied on line 11.

After impingement upon the plates 15, the steam rises in the housing 5 where its velocity is slowed to below the settling velocity of oil droplets by baffles 31. Thus, any remaining oil in the steam settles out and drains into the trough 21 where it mixes with the slurry. The steam then passes through a demister 33 which removes water droplets from the vapor and is discharged to the atmosphere through exhaust port 35 near the top of the housing 5.

The makeup oil supplied to the nozzles 13 is stabilized by driving off with heat the hydrocarbon constituents which would be volatile at the steam processing temperature (220°-300° F.). Thus the oil is injected into a pressure vessel 37 with superheated steam at a temperature above 300° F. and the light hydrocarbons thus separated from the oil are liquified in condensor 39 and collected for suitable disposition. The stabilized oil is transferred by pump 41 through cooler 43 and line 11 to the nozzles 13.

It is desirable in operating the apparatus shown in FIG. 1 to maintain the presure in the housing 5 above ambient pressure to maintain a nonoxidizing atmosphere in the housing and thus eliminate the likelihood of fire or explosion. Under some circumstances, it may be necessary to add additional noncoal bearing steam to the system, such as through the header 7, in order to maintain these conditions. It may also be necessary to add such additional steam to maintain the temperature in the housing above about 220° F. to prevent formation of condensation.

Figure 2:
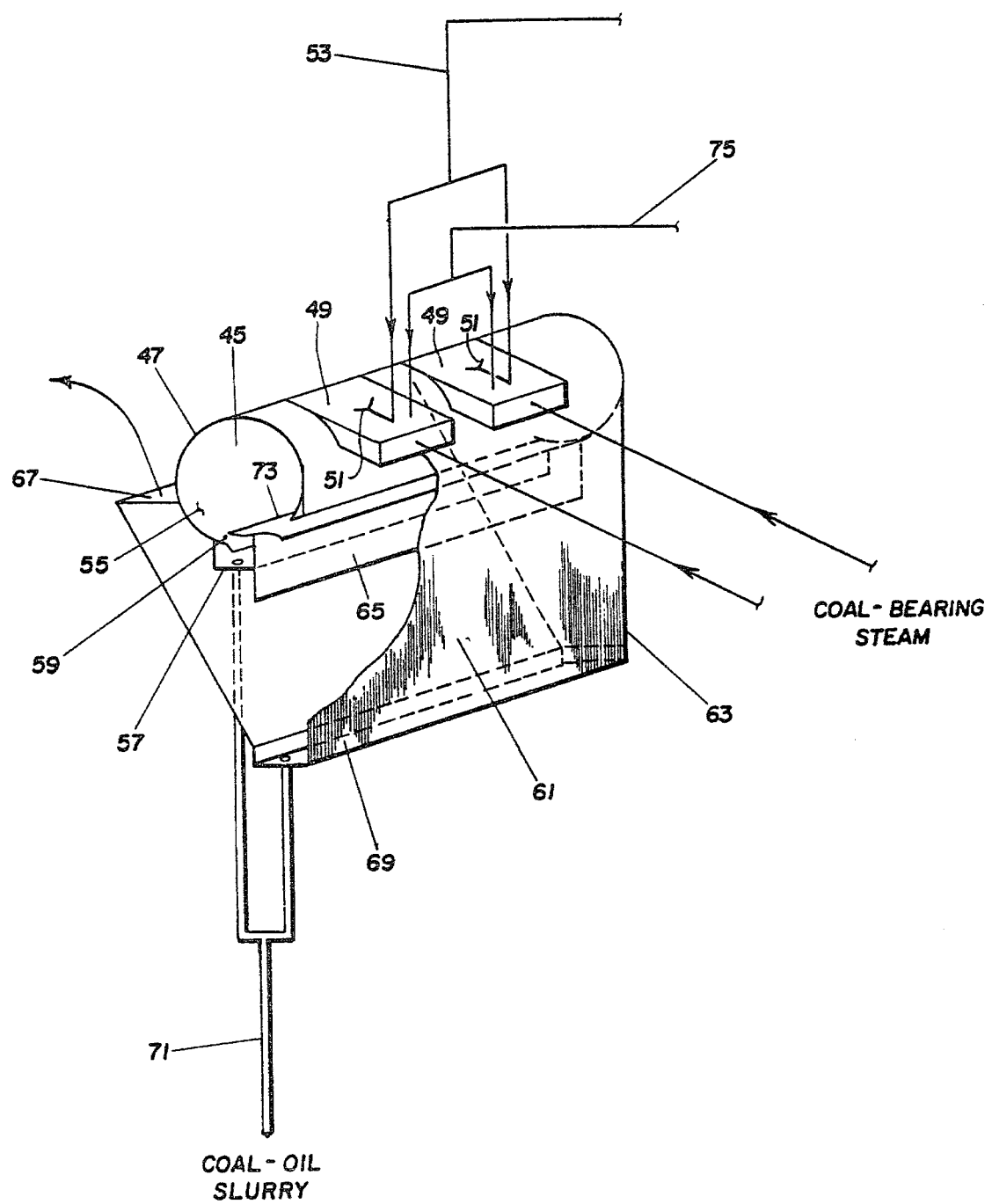
FIG. 2 is a schematic isometric view of apparatus in accordance with another embodiment of the invention.

FIG. 2 illustrates additional apparatus suitable for practicing the invention. In this embodiment, the horizontally disposed cylindrical chamber 45 of a tubular structure 47 is intersected tangentially at its highest point by a pair of horizontally oriented rectangular conduits 49. Steam containing micronized coal from the cyclones of a fluid mill coal pulverizing plant is injected into the conduits 49 where it is mixed with droplets of petroleum oil injected into the flow through nozzles 51. The petroleum oil, which may be stabilized in the manner discussed in connection with the apparatus disclosed in FIG. 1, is supplied to the nozzles 51 through line 53. The resultant coal-oil and steam mixture is injected into the chamber 45 circumferentially along the interior wall 55. The change in direction of the stream produced as it is guided by the curved wall 55 generates a centrifugal force which deposits a coal-oil slurry on the wall 55. The slurry which is driven by the flow of steam and by gravity, flows down the curved wall 55 and drains at the lowermost point of the cylindrical chamber 45 into a trough 57 mounted below a longitudinal slot 59 in the tubular structure 47. The steam passes through the slot 59 into an expansion chamber 61 formed by a housing 63. The steam is directed downward in the chamber 61 by a downwardly depending wall 65 of the trough 57. Once below the bottom of wall 65, the steam rises in an area of increasing cross-section and escapes into the atmosphere through discharge opening 67. The velocity of the steam is slowed in the expansion chamber 61 below the settling velocity of oil droplets so that any remaining oil settles to the bottom of chamber 61 where it is collected in a second trough 69. A line 71 drains both troughs 57 and 69. A deflector 73 mounted on the trough 57 in the slot 59 directs the steam over the trough 57 and reduces turbulence as the steam passes into the expansion chamber 61. Again, the number of conduits 49 is not critical but is related to the volume of coal-bearing steam to be processed and the dimensions of the apparatus. Likewise, the coal-oil slurry drawn off through line 71 may be recirculated by additional nozzles in the conduits 49 to achieve a desired concentration of the slurry. If needed, water can be injected into the conduits 49 through line 75 to control the temperature of the process.

EXAMPLE

Using the apparatus disclosed in FIG. 1, 14,000 pounds per hour of steam containing 200 pounds per hour of micronized coal was processed by injecting the coal-bearing steam into the conduits at a rate of 100 feet per second. A positive 15" of water pressure was maintained in the housing 5 and steam containing 9 pounds per hour of coal was exhausted through discharge opening 35 at a velocity of 10 feet per second. Without recirculation, the slurry collected in trough 21 contained 3-5% coal by weight. By recirculating the slurry through nozzles 27 at the rate of 50 gallons per minute, the concentration of coal in the slurry was raised to a maximum of about 50% by weight using 2 gallons per minute of makeup oil.

While the invention has been disclosed in what is conceived to be practical and effective embodiments thereof, it is recognized that departures may be made therefrom which are fully within the spirit of the invention. Accordingly, the invention is not to be limited to the details specifically disclosed, but is to be accorded to full scope of the appended claims, including any and all equivalents.

I claim:

1. An apparatus for removing micronized coal from a flow of coal-bearing steam exhausted from a coal pulverizer comprising:
   a conduit which guides the flow of coal-bearing steam;
   means disposed in said conduit for introducing droplets of petroleum oil into said flow of coal-bearing steam;
   a tube forming a horizontally disposed cylindrical chamber, said conduit being arranged to introduce said flow of coal and oil bearing steam circumferentially along the interior wall of the cylindrical chamber from a point near the highest point thereof, to deposit a coal oil slurry on said internal wall through centrifugal force;
   a trough disposed below a slot extending longitudinal through the cylindrical chamber at substantially the lowest point of the interior wall of the cylindrical chamber, for collecting the coal-oil slurry deposited on said wall; and
   a housing into which the steam escapes through said slot, said housing forming an expansion chamber in which the velocity of the steam is reduced and additional coal-oil slurry settles to the bottom of said housing, and a second trough at the bottom of the housing for collecting the additional coal oil slurry.

2. The apparatus of claim 1 including a deflector mounted above said first trough to deflect steam across said first trough and into said housing, said deflector and cylindrical chamber defining an elongated space through which the coal-oil slurry deposited on the interior wall of the cylindrical chamber can run into the trough.

3. The apparatus of claim 2 wherein the housing forming the expansion chamber includes a first and second section, said first section extending downwardly and being of constant cross-section and said second section extending upwardly from the lower end of said first section and being of increasing cross-section with a discharge opening in the upper portion thereof through which the steam may exit the apparatus.

4. The apparatus of claim 3 wherein a wall depends downwardly from the first trough, said wall extending toward, yet terminating short of, the second trough and said wall being parallel with one side of said housing such that, together, said wall and said side define two sides of the expansion chamber's first section of constant cross-section.

5. The apparatus of claim 4 wherein the wall divides the housing into the first and second sections of the expansion chamber.

6. An apparatus for removing micronized coal from a flow of coal-bearing steam exhausted from a coal pulverizer comprising:
   means for guiding the continuous flow of said coal-bearing steam;
   means for spraying droplets of petroleum oil into said flow of coal-bearing steam disposed in said guiding means such that said oil is carried along with said flow;
   a housing connected to said guiding means, said housing having an interior curved wall section along which said flow is introduced tangentially and is guided in an arcuate path whereby said coal-oil slurry is deposited on said curved wall section by centrifugal force;
   trough means disposed below a slot extending longitudinally along the housing at a lower portion of the curved wall section for collecting the coal oil slurry that is deposited on said curved wall; and
   a housing into which the steam escapes through said slot, said housing forming an expansion chamber having a first and second section, said first section extending downwardly and being of constant cross-section and said second section extending upwardly and being of increasing cross section with a discharge opening in the upper portion thereof and a second trough at the bottom of said expansion chamber such that as the velocity of the steam is reduced in the expansion chamber, additional coal slurry is deposited in said second trough and the steam exits through said discharge opening.

* * * * *